United States Patent [19]

Ikuma

[11] Patent Number: 5,075,527

[45] Date of Patent: Dec. 24, 1991

[54] APPARATUS AND METHOD FOR WELDING JOINT FIXTURES TO A PIPE

[75] Inventor: Takeji Ikuma, Shizuoka, Japan

[73] Assignee: Xepro Tubing Co., Ltd., Shizuoka, Japan

[21] Appl. No.: 544,662

[22] Filed: Jun. 27, 1990

[30] Foreign Application Priority Data

Jul. 1, 1989 [JP] Japan ................................. 1-170013

[51] Int. Cl.⁵ .............................................. B23K 9/00
[52] U.S. Cl. ................................ 219/59.1; 219/60 R; 219/125.11; 219/159; 228/49.3
[58] Field of Search ................ 219/159, 125.11, 60 R, 219/61; 228/44.5, 49.2, 49.3, 59.1

[56] References Cited

U.S. PATENT DOCUMENTS

| 3,239,209 | 3/1966 | Kucka | 219/159 |
| 3,255,336 | 6/1966 | Purcell | 219/125.11 |
| 4,896,812 | 1/1990 | Kazlauskas | 219/60 A |

FOREIGN PATENT DOCUMENTS 511173  2/1977  U.S.S.R. ............. 219/60 A

*Primary Examiner*—Clifford C. Shaw
*Attorney, Agent, or Firm*—Frishauf, Holtz, Goodman & Woodward

[57] ABSTRACT

An apparatus and a method for welding joint fixtures to either end of a pipe at a given angles of attachment. A retaining mechanism on both the driver side and the follower side for joint fixtures is provided on either end of a horizontally elongated table on which a pipe is to be horizontally placed. The joint fixtures are secured on the opposing inner ends of the retaining mechanisms via clamping devices to receive the pipe therebetween. The retaining mechanism for the joint fixture on the driver side includes a device for establishing the angle of attachment of the joint fixture so that the joint fixture can be turned to a predetermined angular position. After the angle of attachment of the joint fixture to the pipe is determined, the junctions between the joint fixtures and the pipe on either end are held in place by gripping devices for tentative welding using welding torches. When the tentative welding is completed, the gripping devices are released and the entire circumference of respective junctions is welded by the welding torches.

7 Claims, 5 Drawing Sheets

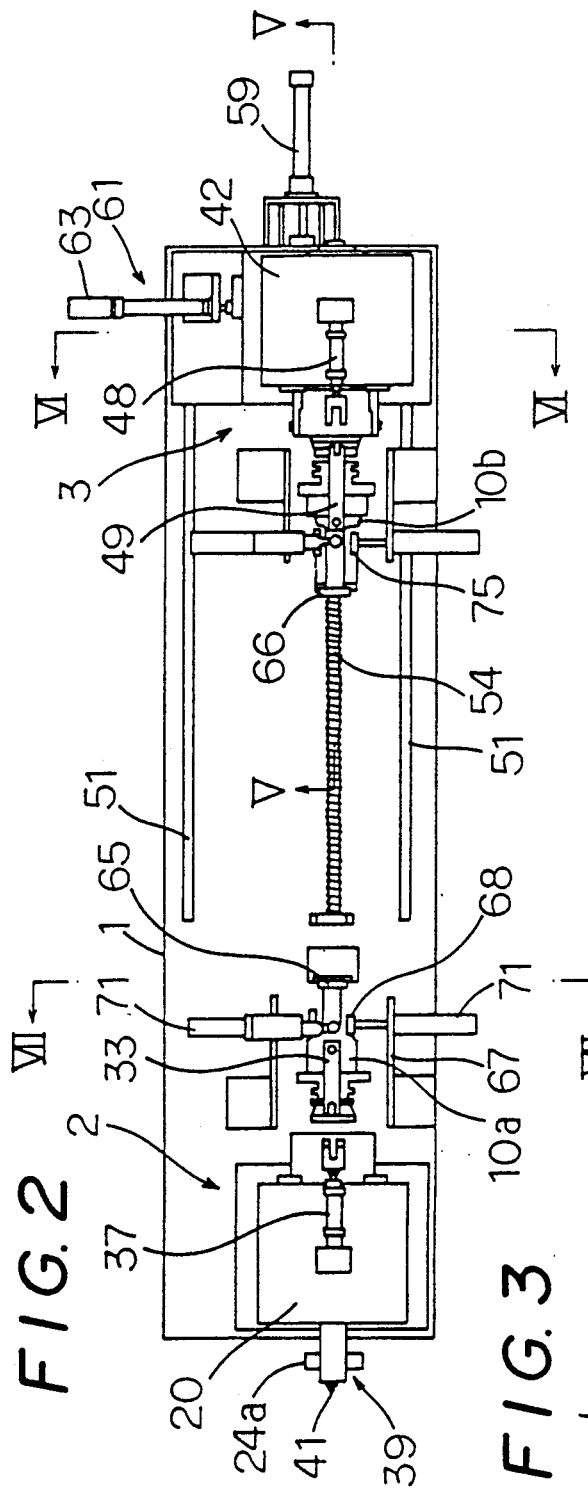
FIG. 2
FIG. 3
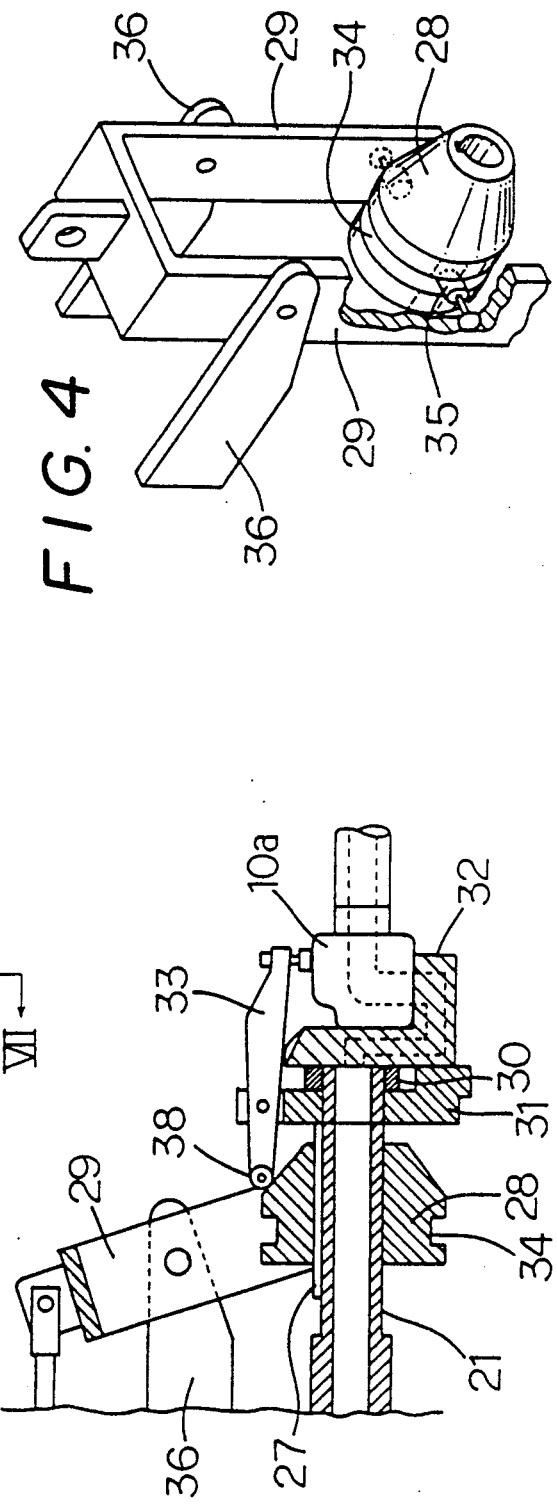
FIG. 4

APPARATUS AND METHOD FOR WELDING JOINT FIXTURES TO A PIPE

BACKGROUND OF THE INVENTION AND RELATED ART STATEMENT

The present invention relates to an apparatus and a method for welding joint fixtures such as flanges and elbows at either end of a pipe. More particularly, it relates to an apparatus and a method for automatically welding joint fixtures at either end of a pipe at predetermined angles.

In the manufacturing of steel pipes for hydraulic pipings of power machines used in various industries and construction works such as bulldozers and power shovels, joint fixtures such as flanges and elbows are attached to either end of a pipe to connect the same with relevant parts within the machine. Joint fixtures such as elbows do not always open in the same direction at both ends of a pipe; rather, they are often welded at different angles so that the pipe ends on both sides would open in different directions from each other. Pipe products of this type are in most cases formed with one or more bent portions 91 as shown in FIG. 14. These bends 91 are formed after joint fixtures 92a, 92b are welded to a straight pipe 90. Thus, each joint fixture is welded to a pipe end at an angle which is determined based on the anticipated final pipe configuration with bends.

As one prior art means for welding joint fixtures to either end of a pipe at predetermined angles, there is known a method which utilizes a jig that in turn includes a plate and blocks provided on either side of said plate to support the joint fixtures at predetermined angles.

According to the prior method, each joint fixture is placed on respective blocks so that each can be held and fixed at predetermined angles. Thus held at predetermined angles, each joint fixture is tentatively welded to a pipe end by welding at several spots on the periphery. The pipe attached with the fixtures is then detached from the jig, and the junctions between the pipe ends and the fixtures are firmly connected by welding while rotating the pipe assembly.

The prior art method mentioned above is defective in that a jig must be fabricated each time to accommodate to specific requirements such as the configuration, size and the angle of attachment of the fixtures. This involves considerable time, labor and cost even before proceeding with the welding operation. It also requires a large space and cost to store and adequately maintain the jigs of different specifications for future use. Use of the jig is further defective in that the flow in the welding operation is disturbed when the pipe tentatively fixed with the joint fixtures is detached from the jig and transferred to a welding apparatus for final welding. This adversely affects operationally efficiency and results in a higher production cost.

SUMMARY OF THE INVENTION

The present invention aims at overcoming the above mentioned defects in the prior art and providing an apparatus and a method for welding joint fixtures to pipes of any specifications without using the prior art jig. According to the present invention, the steps of determining the angles at which the joint fixtures are to be attached to the pipe ends and the subsequent tentative and final weldings of the fixtures to the pipe ends can be carried out continuously and automatically.

In order to attain the objects, the welding apparatus according to the present invention is characterized by the following structure: The apparatus includes a horizontally elongated table on which a pipe is to be arranged horizontally; a driver side and a follower side retaining mechanisms for joint fixtures disposed at a distance on either side of said table, each having a rotary shaft which is coaxially aligned with the pipe and each having at its respective opposing end a clamping device for holding joint fixtures; the retaining mechanism for joint fixtures on the driver side being fixed to the table and provided with a device for indexing the angle of the joint fixture held in place by the clamping device as relative to the pipe; the retaining mechanism on the follower side being movable along the length of the table; a gripping device provided near each clamping device of the retaining mechanisms on both the driver and the follower sides to hold the pipe and the joint fixtures concentrically at respective junctions; and a pair of welding torches for welding the junctions between the pipe and the joint fixtures around the entire circumference.

Joint fixtures are welded to either end of a pipe using the welding apparatus of the above construction and according to the following procedure.

A joint fixture is placed on clamping devices of the retaining mechanisms on both the driver and the follower sides, and a pipe is arranged to be suspended between the clamping devices. The joint fixture on the driver side is turned via the clamping devices for an angle which is indexed in advance relative to the angle of the other joint fixture on the follower side. The retaining mechanism on the follower side is then moved closer to the driver side, so that the end face of each joint fixture abuts against respective pipe ends. Whereupon, the gripping devices disposed on both sides of the joint fixture press against and grip the junction between the fixture and the pipe end concentrically. With the fixtures and the pipe thus held, a pair of welding torches disposed perpendicular to the gripping devices are caused to discharge an arc for tentative welding of the junctions. The gripping devices are then released to expose the entire periphery of each junction, an arc is discharged from one of the torches to weld the entire periphery of each junction while turning the pipe assembly by rotating the driver side retaining mechanism.

As the final welding is completed, the pipe assembly with the joint fixtures at either end is detached from the clamping devices of the retaining mechanisms on both sides, and a mechanism provided on both of the retaining mechanisms for restoring the initial position is actuated to cause the clamping devices to return to the initial positions where the clamping devices initially hold the fixtures in place at predetermined angles to resume the welding operation for next set of pipe and joint fixtures.

BRIEF DESCRIPTION OF THE DRAWINGS

FIG. 2 is a plan view of the welding apparatus.

FIG. 3 is a partial sectional view to show the construction of the clamping devices on which joint fixtures are placed.

FIG. 4 is a partial perspective view to show the construction of the clamping devices.

DETAILED DESCRIPTION OF THE PREFERRED EMBODIMENT

Figure 1:
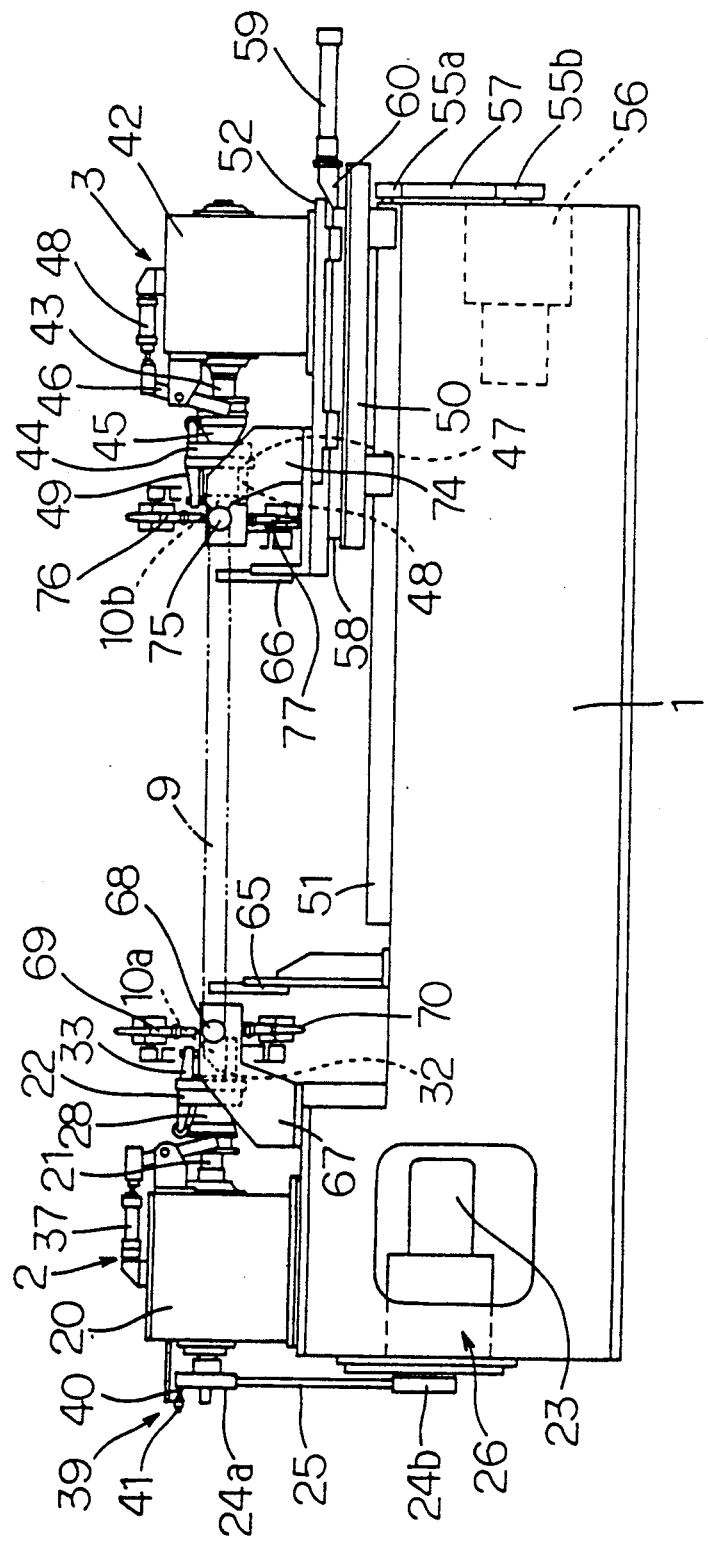
FIG. 1 is a front view of the welding apparatus according to the present invention to show the construction.
Figure 5:
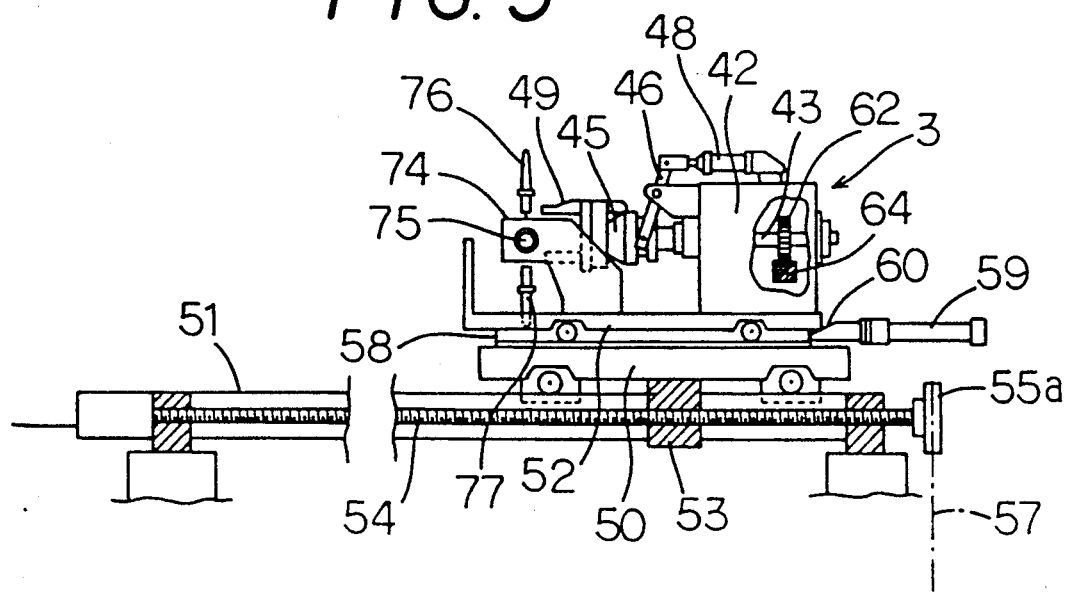
FIG. 5 is a section of the apparatus along the line V—V in FIG. 2.

Referring now to FIGS. 1 and 2, the welding apparatus according to the present invention includes a retaining mechanism 2 for joint fixtures on the driver side and a retaining mechanism 3 for joint fixtures on the follower side that are disposed at a given distance on either end of an elongated table 1 to receive a pipe 9 therebetween.

The retaining mechanism 2 on the driver side includes a spindle 21 rotatably journalled within a frame 20, a clamping devices 22 provided on the inner end of said spindle 21 to hold a joint fixture 10a and a pulse motor 23 for rotating the spindle 21, the pulse motor 23 being connected with pulleys 24a and 24b at the outer end of the spindle 21 via a belt 25.

The pulse motor 23 is provided with a device 26 which causes the clamping device 22 together with the joint fixture mounted thereon to rotate from its initial position for a predetermined angle so that the joint fixture will be attached to the pipe end at a given angle. By manipulating a control panel (not shown), the device 26 for indexing the angle of joint fixture causes the clamping device 22 with the joint fixture 10a mounted thereon to turn for a predetermined angle via the pulse motor 23.

The clamping device 22 which holds the joint fixture 10a includes, as shown in FIGS. 3 and 4, a conical cam 28 movable only in the axial direction of the spindle 21 by means of a key 27, a U-shape lever 29 for moving the conical cam 28, a flange 31 provided on one end of the spindle 21 via a nut 30, and a fixed claw 32 and a movable claw 33 provided outside the flange to hold the joint fixture 10a.

The conical cam 28 has a groove 34 around its outer circumference; this groove 34 receives a roller 35 which projects from the inner side of the U-shape lever 29 at the lower end. The U-shape lever 29 is journalled at its mid height with an arm 36 on either side, the arm being projected from the frame 20 shown in FIG. 1. At the same time, the upper end of the lever 29 is connected to a cylinder 37 which is provided at the top of the frame 20, so that the cylinder 37 causes the lever 29 to rotate and move the conical cam 28 along the axis of the spindle 21. The fixed claw 32 projecting outward from the flange 31 functions as a horizontal strip that supports the joint fixture 10a. The movable claw 33 is journalled to the flange 31 in a freely swinging manner at its mid portion so that the claw 33 opposes the fixed claw 32. A roller 38 provided on one end of the claw 33 is in contact with the sloped peripheral side of the conical cam 28. Thus, the tip end of the movable claw 33 will swing in the vertical direction as the other end slides on the sloped side of the conical cam 28 when the cam 28 is moved along the spindle 21, to either effect or release the engagement of the fixture 10a between the claws 32 and 33.

As shown in FIG. 1, the joint fixture retaining mechanism 2 on the driver side is provided with a device 39 which, when welding operation is completed, restores the clamping device 22 to its initial position which it assumed prior to being rotated. The position restoring device 39 may comprise, for example, a projection 40 which indicates the initial position and which is provided on the side of the pulley 24b at the outer end of the spindle 21, and a sensor 41 such as a switch which is provided on the frame 20 in the proximity of the projection 40 to detect the initial position. The sensor 41 for detecting the initial position is in electrical connection with the pulse motor 23. Upon completion of the welding operation, when the pulley 24b stops at a point slightly beyond the predetermined angular position for starting the welding operation, the pulse motor 23 is rotated by a control system which is programmed in advance to a position where the projection 40 on the pulley 24b approaches the sensor 41, in other words the initial position of the clamping device. The pulse motor 23 thus stops rotating and allows the clamping device 22 to return to its initial position.

In the meantime, the joint fixture retaining mechanism 3 on the follower side provided on the other end of the table 1 includes a frame 42 to which a spindle 43 is journalled coaxially with the spindle 21 of the retaining mechanism 2 on the driver side and further includes a clamping device 44 for a joint fixture 10b which is provided at one end of the spindle 43 on the inner side of the frame 42. The clamping device 44 comprises, like the clamping device 22 of the retaining mechanism 2, a conical cam 45, a U-shape lever 46 and a flange 47 provided with a fixed claw 48 and a movable claw 49, and a cylinder 48.

A carriage 50 movable in the longitudinal direction of the table 1 along a pair of rails 51 is provided on the table 1 on the follower side, and a platform 52, movable in the direction of the carriage's movement, is provided on the carriage 50. The joint fixture retaining means 3 on the follower side is arranged on the platform 52.

A block 53 provided at the bottom of the carriage 50 engages with a threaded rod 54 which is disposed between the pair of rails 51. A pulley 55a located at one end of the threaded rod 54 that extends out of the table 1 and a pulley 55b of a servo motor 56 provided inside the table 1 are connected via a belt 57 so that as the threaded rod 54 is rotated by means of the motor 56, the carriage 50 is caused to move on the rails 51.

The platform 52 is mounted on a pair of short rails 58 that are in parallel to the rails 51 provided on the carriage 50. The rear end of the platform 52 is connected to a piston rod 60 of a cylinder 59 which is fixed at the outer end of the carriage 50 so that the platform 52 moves on the rails 58 by the action of the cylinder 59.

Figure 6:
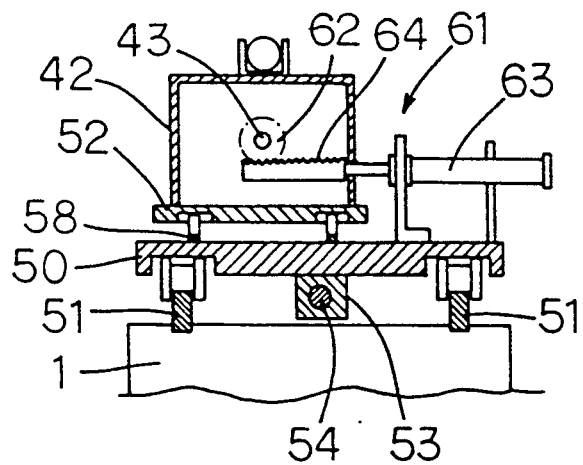
FIG. 6 is a section of the apparatus along the line VI—VI in FIG. 2.

As shown in FIG. 2, the joint fixture retaining mechanism 3 on the follower side is, like the retaining mechanism 2 on the driver side, provided with a device 61 for restoring the clamping device 44 to its initial position after welding is completed. The restoring device 61 comprises, as shown in FIG. 6, a pinion 62 provided at one end of the spindle 43, and a rack 64 provided at the tip end of the cylinder 63 which is provided on the platform 52 normal to the spindle 43 to engage with the pinion 62.

As shown in FIG. 1, a pipe 9 of a predetermined length is placed between the fixture retaining means 2 and 3 on the driver and the follower sides. A support 65 erected on the table 1 on the driver side and a support 66 erected on the inner side of the platform 52 support the pipe 9 on either end coaxially with the axes of the spindles 21 and 43 of the retaining means 2 and 3 respectively.

Figure 7:
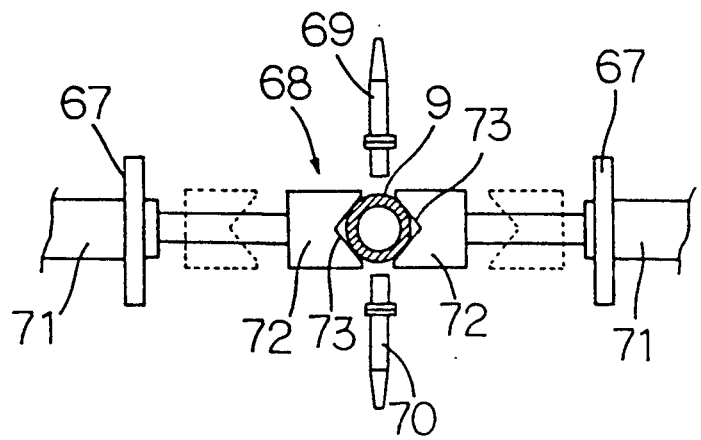
FIG. 7 is a section of the apparatus along the line VII—VII in FIG. 2.

A pair of gripping devices 68 is provided near the clamping device 22 of the retaining mechanism 2 via the arm 67 projecting from the table 1 to concentrically hold the pipe and the joint fixtures at the junctions prior to tentative welding. A pair of welding torches 69, 70 are disposed in a vertical arrangement normal to the pair of gripping devices 68. The gripping devices 68 each comprises, as shown in FIG. 7, a cylinder 71 supported horizontally by means of the arm 67 and a grip jaw 72 with a V-shaped notch 73 at the tip end.

A pair of gripping devices 75 of the identical construction as mentioned above and a pair of welding torches 76, 77 in a vertical arrangement are provided near the clamping devices 44 of the retaining mechanism 3 on the follower side via the arm 74 projecting from said platform 52.

Figure 8:
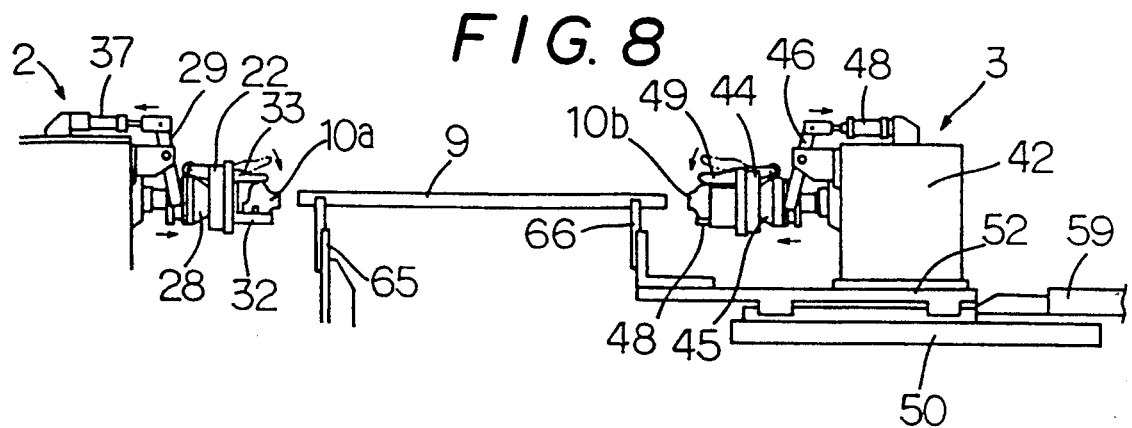
FIGS. 8 through 10, FIGS. 12 and 13 are schematic front views to show the apparatus during welding operation.

In order to weld the joint fixtures 10a, 10b to either end of the pipe 9 using the welding apparatus of the above construction, the retaining mechanism 3 on the follower side is first moved to the far right as shown in FIG. 8 by means of the carriage 50. The clamping devices 22 and 44 of the retaining mechanisms 2 and 3, respectively, are mounted with the joint fixtures 10a and 10b, and the pipe 9 is placed between the joint fixtures 10a and 10b. Before mounting the joint fixtures 10a and 10b on the clamping devices 22 and 44, respectively, for welding, the clamping devices are first rotated to return to their initial positions so that the both fixed claws 32 and 48 would be disposed horizontally.

Figure 9:
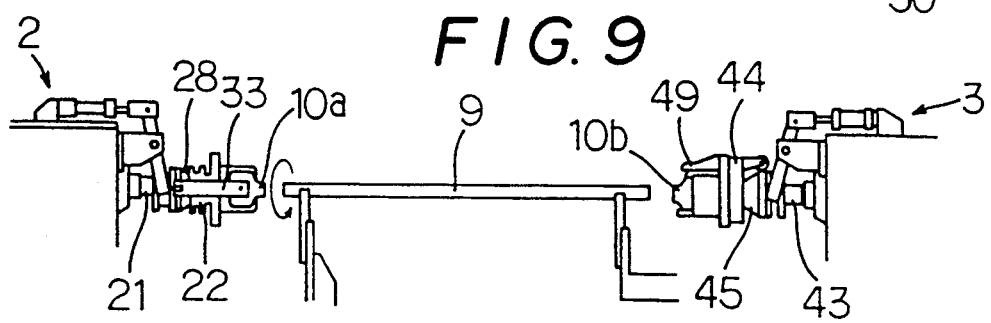

As shown in FIG. 9, the angle setting device 26 of the retaining mechanism 2 is manipulated to turn the clamping device 22 together with the joint fixture 10a for a given angle that has been predetermined as relative to the angle of the other joint fixture 10b.

Figure 10:
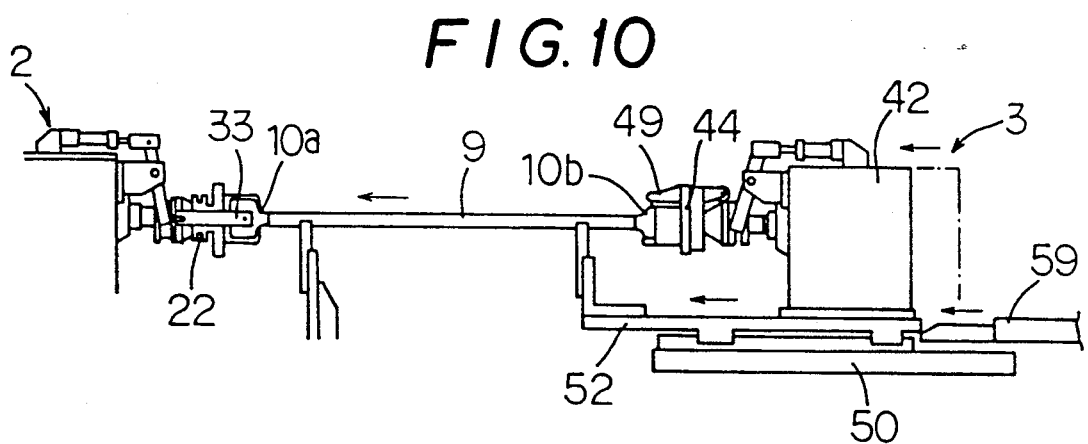

When the attachment angle of the joint fixture 10a is established, then, as shown in FIG. 10, the retaining mechanism 3 on the follower side is moved toward the mechanism 2 by means of the carriage 50. At the same time, the platform 52 is caused to move in the same direction so that the pipe 9 abuts against the joint fixtures 10a and 10b at either end.

Figure 11:
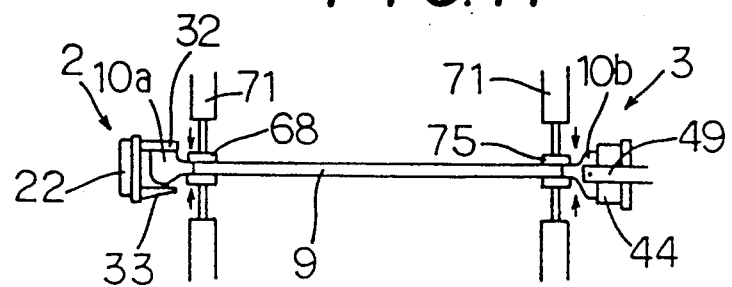
FIG. 11 is a schematic plan view of the apparatus to show the welding steps.
Figure 12:
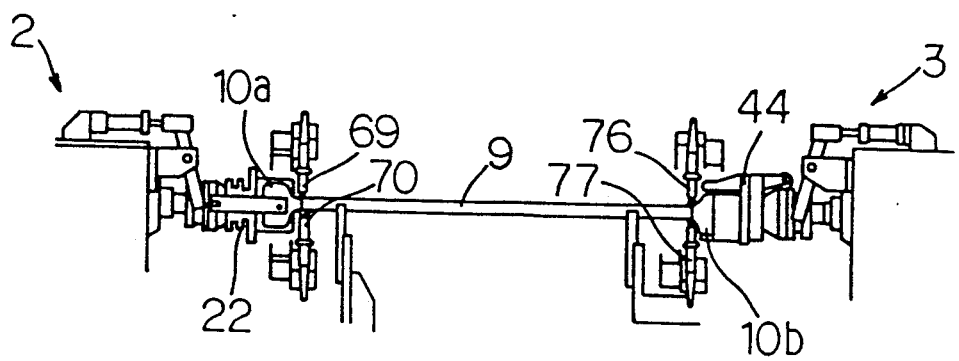

As shown in FIG. 11, the cylinder 71 of each gripping device 68 and 75 is actuated to connect the connecting ends 11a and 11b of the joint fixtures 10a and 10b with respective ends of the pipe 9, so that the grip jaw 72 will hold the pipe assembly concentrically at respective junctions with its V-shape notches 73. This being completed, respective pairs of welding torches 69, 70 and 76, 77 are used to spot-weld the junctions between the pipe 9 and the joint fixtures 10a, 10b at at least two points for provisional connection as shown in FIG. 12.

Figure 13:
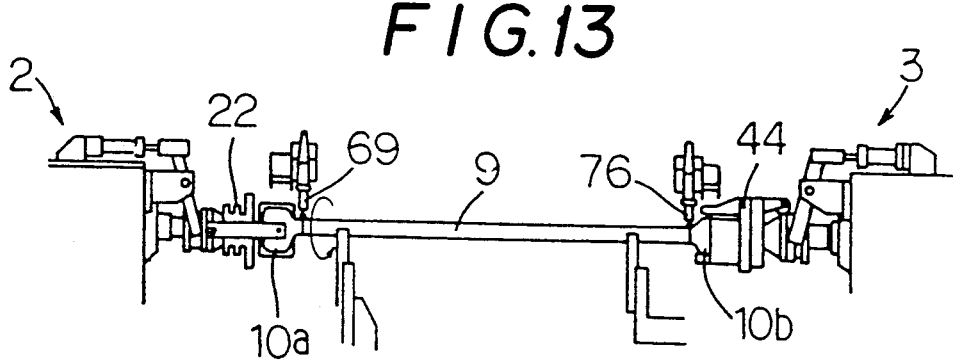
Figure 14:
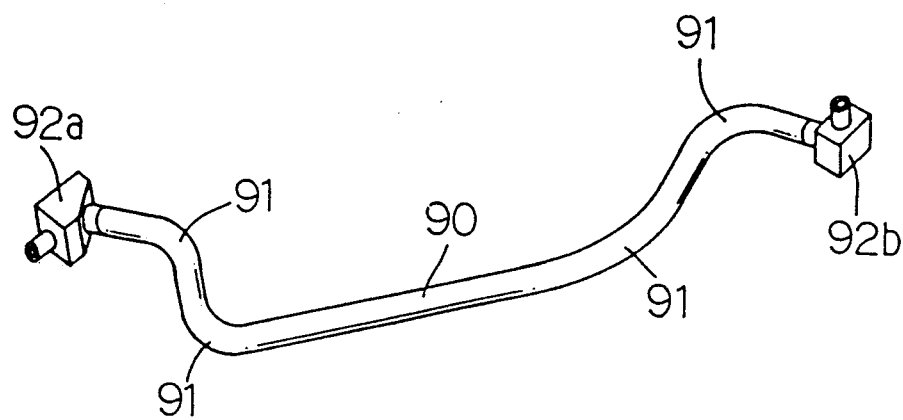
FIG. 14 is a perspective view to show an example of a pipe in a hydraulic piping system to which the present invention is applicable.

As the joint pipe fixtures are provisionally welded to either end of the pipe, the gripping devices 68 and 75 are released. At the same time, the air is evacuated from the cylinder 63 of the initial position restoring means 61 on the follower side to lift the load so as not to hamper the rotation of the spindle 43. As shown in FIG. 13, the pulse motor 23 on the driver side is actuated to rotate the joint fixture 10a on the clamp 22 via the spindle 21. Concurrently, the junctions are subjected to final welding using one of the torches 69 and 76. As the spindle 21 on the driver side is rotated to cause the pipe assembly to rotate, the spindle 43 on the follower side mounted with the joint fixture 10b is rotated to follow the movement because the joint fixtures 10a and 10b are both provisionally welded to the pipe 9. In this manner the entire circumference of the junctions between the pipe 9 and the joint fixture 10b is also welded by the torch 76.

The final welding will complete at a point slightly beyond the point where the welding was initially started. When the welding is completed and the clamping devices 22 and 44 are released, the retaining mechanism 3 on the follower side is retracted to its initial position to remove the pipe 9 welded with the joint fixtures out of the supports 65 and 66. As the pipe 9 is taken out of the apparatus, the clamping devices 22 and 44 of the retaining mechanisms 2 and 3 on the driver and the follower sides respectively are returned to their initial positions by means of the initial position restoring mechanisms 39 and 61.

In this case, the clamping device 22 on the driver side returns to its initial position as the pulse motor 23 is automatically rotated after a lapse of time after release of the clamping device 22 to cause the projection 40 of the pulley 24b to approach the position sensor 41, where the rotation of the spindle 21 is suspended. The clamping device 44 on the follower side returns to its initial position as the cylinder 63 pulls back the rack 64 after the clamping device means 44 is released and the spindle 43 is rotated to return to its initial position via the pinion 62. These steps are automatically controlled by a sequence control system which is programmed for the purpose in advance.

As the welding apparatus according to the present invention is provided with a mechanism for establishing the angle of the joint fixture to be attached to the pipe at the driver side, joint fixtures are attached to the respective pipe ends at adequate angles by turning one of the joint fixtures for a predetermined angle as relative to the other joint fixture.

As the retaining mechanism 3 on the follower side is movable along the length of the table 1, the apparatus can accommodate any length of pipe and can accurately align the pipe ends with the joint fixtures.

At the junctions between the joint fixtures and the pipe ends are disposed, in a vertical arrangement, a pair of welding torches that are perpendicular to the corresponding gripping devices, so that the pipe ends and the joint fixtures are concentrically held in place and subjected to provisional welding successively without interruption. Moreover, when the provisional welding is completed, as the rotation of the retaining mechanism 2 on the driver side is transmitted to the mechanism 3 on the follower side via the pipe assembly by releasing the gripping device, the final welding can also be conducted sequentially without interruption. The welding apparatus according to the present invention therefore carries out a series of welding operations automatically and continuously, including clamping the joint fixtures against the pipe, establishing the angles of attachment, aligning and securely holding the joint fixtures concentrically with the pipe ends, and provisionally as well as finally welding the pipe assembly. When compared with other similar prior art welding methods, the present invention is expected to achieve improved efficiency in the welding of pipe joints and significant cost reduction in production thereof.

There has thus been shown and described a novel apparatus and method for welding joint fixtures to a pipe which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for welding joint fixtures to the ends of a narrow pipe, said apparatus comprising:
   a table horizontally elongated along the length of the pipe and which supports the pipe at both ends thereof, said table having a driver side at one end of the pipe and a follower side at the opposite end of the pipe;
   retaining mechanisms for joint fixtures disposed at the opposite sides of said table, one retaining mechanism being on the driver side of the table and the other on the follower side of the table, each retaining mechanism having a rotary shaft that is coaxially aligned with the pipe and that has an end opposing the end of the other rotary shaft and on which are mounted clamp means for holding a joint fixture, said retaining mechanism for a joint fixture on the driver side being fixed on the table and having a means for turning the joint fixture for a predetermined angle so that the joint fixture will be arranged at a given angle of attachment to the pipe, and said retaining mechanism for the joint fixture on the follower side of the table being movable in the longitudinal direction of the table;
   a pair of grip means disposed adjacent the clamp means of the retaining mechanism on both the driver and the follower side to hold the joint fixtures and the pipe suspended therebetween securely in place in a concentric manner;
   a pair of welding torches disposed both on the driver side and follower side of said table in a vertical arrangement and normal to said grip means, each pair of welding torches being operative to weld a joint fixture to one end of the pipe; and
   means for rotating one of the retainer mechanisms to rotate the fixtures and pipe during welding.

2. The apparatus for welding joint fixtures to a pipe as claimed in claim 1, wherein retaining mechanisms for joint fixtures on the driver side and on the follower side are each provided with means for storing the rotary shaft of the retaining mechanism to its initial position after welding is completed so that a joint fixture to be welded in the subsequent cycle can be retained at the given angle required for its attachment.

3. The apparatus for welding joint fixtures to a pipe as claimed in claim 2, wherein said means for restoring the rotary shaft of the retaining mechanism on the driver side to its initial position includes:
   a projection for indicating the original angular position which is provided on a pulley at one end of the rotary shaft; and
   a sensor for detecting the initial position, indicated by the projection, which is connected to a pulse motor, said pulse motor actuating the rotary shaft in response to said sensor.

4. The apparatus for welding joint fixtures to a pipe as claimed in claim 2, wherein said position restoring mechanism on the follower side comprises a pinion provided at one end of the rotary shaft, and a rack which is actuated by means of a cylinder which in turn is disposed normal to the rotary shaft supported on a platform.

5. The apparatus for welding joint fixtures to a pipe as claimed in claim 1, wherein said clamp means for securing the joint fixtures on the driver and the follower sides each include a conical cam which is provided on one end of the rotary shaft and is movable in the axial direction, a cylinder which causes the conical cam to move along the rotary shaft via a U-shape lever, a flange which is provided at the tip end of said rotary shaft, a fixed claw projecting horizontally from the flange on its outer side, and a movable claw journalled to the outer periphery of said flange in a freely swinging manner.

6. The apparatus for welding joint fixtures to a pipe as claimed in claim 1, wherein said grip means for holding the pipe and the joint fixtures at their junctions in place comprises a pair of grips with a V-shape notch each at the tip that are laterally arranged on both sides of the junction, and a cylinder which presses the grips simultaneously against the junction from both sides.

7. The apparatus for welding joint fixtures to a pipe as claimed in claim 1, wherein said pair of welding torches for welding the junctions between the pipe and the joint fixtures are the pair of welding torches that are vertically arranged so as to point the nozzles from the top and the bottom of the junction.

* * * * *